Patented Dec. 22, 1931

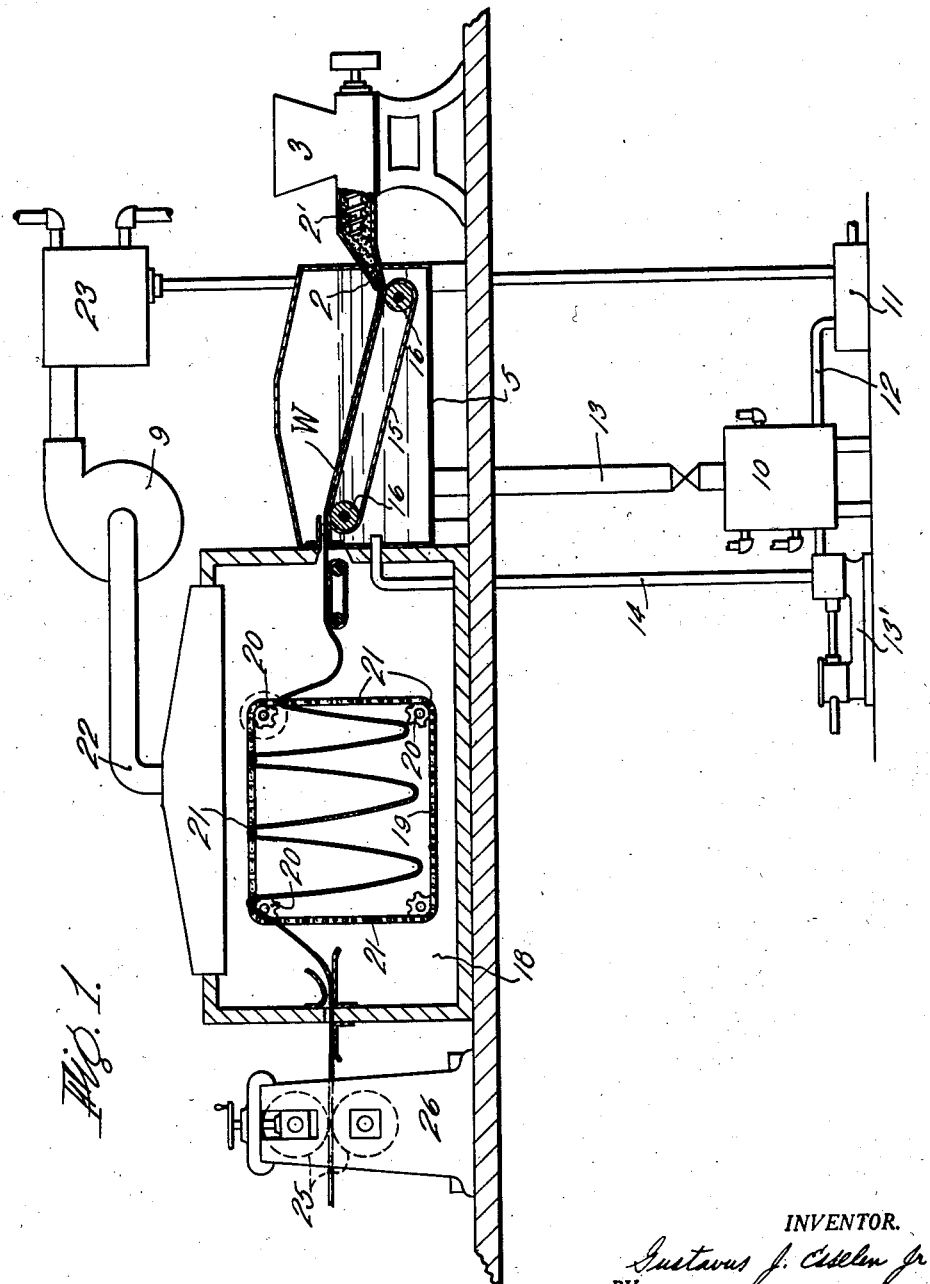

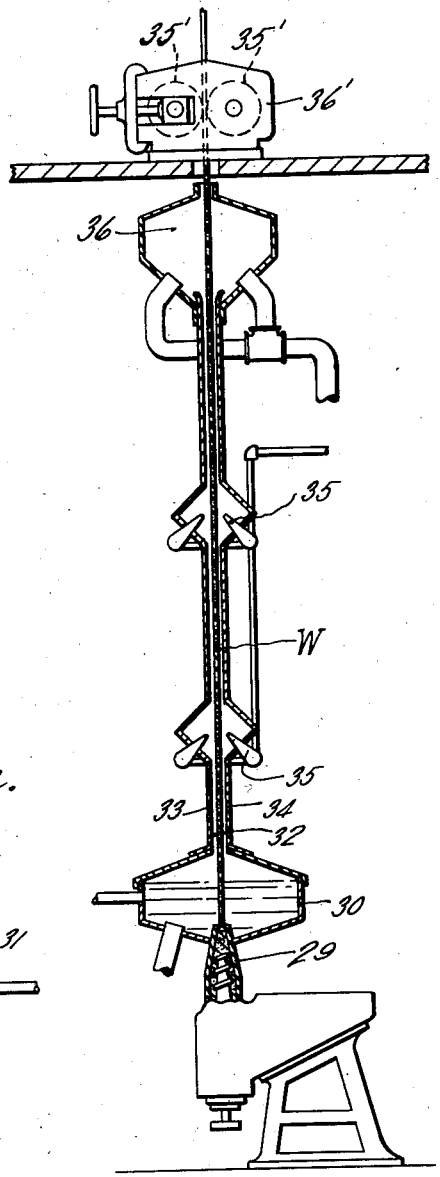
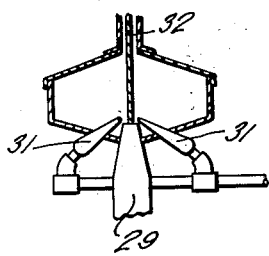

1,837,854

UNITED STATES PATENT OFFICE

GUSTAVUS J. ESSELEN, JR., OF SWAMPSCOTT, MASSACHUSETTS, ASSIGNOR TO THE FIBERLOID CORPORATION, OF INDIAN ORCHARD, MASSACHUSETTS, A CORPORATION OF MASSACHUSETTS

METHOD AND APPARATUS FOR MAKING CONTINUOUS WEBS

Application filed January 26, 1928. Serial No. 249,744.

This invention relates to improvements in apparatus for and method of forming webs from plastic material and is directed more particularly to the production of a continuous web from a mass of such material as pyroxylin or other cellulose compounds.

The invention is adapted for broad application wherever it is desired to form a continuous web from a mass of plastic material; but in order to facilitate a clear understanding of the novel features of the invention, it will be disclosed for descriptive purposes in connection with the forming of a web from cellulose esters, pyroxylin and the like.

A brief description of the prior art method of making pyroxylin sheets will be first outlined in order that the novel features and advantages as well as the mode of operation of my novel method and apparatus may be best understood.

Accordingly, in the prior art method of producing sheets from such material as pyroxylin, the steps are as follows. Subsequent to the necessary purifying operations, the pyroxylin material is mixed with various solvents or solvent mixtures so as to provide a more or less plastic doughy mass. It is customary to vary the plasticity of the mass or the amount of solvent it contains within wide limits, depending upon what degree of plasticity is most desired or suitable for use in connection with subsequent steps in the process, it being understood that the mass, in order to have the desired workability, may contain any predetermined or definite amount of solvent or solvent mixture of some kind or other. The pyroxylin mass is strained at some stage where desirable or necessary; and when in suitable condition, it is rolled between coacting pressure rolls and reduced to the form of relatively thick sheets, oftentimes called slabs.

In some instances, it is desired to drive off part of the solvent mixture during the rolling operation; and this is accomplished in some cases by heating the rolls to accelerate the action, while in other cases sufficient heat is generated by the rolling action to warm up the rolls and accomplish the results, perhaps to a less degree than where the rolls are actually heated. The material, when it leaves the rolls in the form of somewhat pliable slabs or sheets, contains considerable solvent or solvent mixture. These slabs are piled one on the other to form a stack which is subjected to heat and pressure in a suitable pressing apparatus. The heat in this operation tends to soften the material and the pressure acts to compact the mass so as to form a unified solid block which contains an appreciable amount of solvent mixture, which is more or less necessary in order to condition the block for a sheeting operation.

The sheeting operation consists in slitting or planing sheets of various thicknesses from the block, which sheets still necessarily contain some degree of solvent because the solvent is not entirely driven off by the sheeting operation.

The sheets thus cut or sliced from the block are then seasoned or cured to the desired degree, as by drying, so as to eliminate as much of the remaining solvent as is practicable; which curing is often accomplished by confining the sheets in a heated compartment of some sort, or the sheets may be dried by exposure to atmospheric conditions. Finally, the seasoned or dried sheets are finished or polished by being placed between polished metal plates and subjected to heat and pressure, whereby the heat tends to soften the material while the pressure smooths out the same, rendering the surface of the sheets smooth and glossy.

It will be apparent from the above that in producing the finished sheets from the mass numerous steps are employed in order not only to eliminate the solvent to condition the material but are actually necessary to change the form of the material step by step as from a mass to slabs, from slabs to a block, and from a block to sheets. The process therefore is objectionable because of the costly equipment which is necessary and because the finished sheets are costly, which is due not only to the labor involved but to the loss of solvent which is continually being driven off into atmosphere during the many steps of the process.

One important objection is that the size of the finished sheets are limited entirely by the size of the apparatus employed. For instance, the dimension of the block is limited by the dimensions of the block forming press, which under the most favorable conditions will accommodate a block less than ten feet in length and it is often desired to produce sheets having a length in excess thereof.

The principal object of my invention is to overcome the objections and disadvantages of the prior art process and therefore according to one novel feature of the invention I provide an apparatus for and a method of directly transforming a mass of plastic material into web form, thereby eliminating numerous steps in the prior art process and effecting a considerable saving in manufacturing cost due to the saving in labor.

According to another novel feature of the invention, I provide a method wherein the steps are performed in succession so that as a whole the method or process is continuous, thereby obviating the handling of material between the steps.

According to a further novel feature, I am enabled to recover solvent during the web forming and other steps which is lost in the prior art method and thereby effect economy in operation.

According to a still further feature, I provide an apparatus for and a method of producing a continuous web of material whereby sheets to be cut therefrom are not limited in length as is the case with the prior art processes where they are limited by the length of the pressing apparatus for forming a block.

Various other novel features and advantages will be observed from the following description of the invention, which for the purposes of disclosure is directed particularly to cellulose ester or pyroxylin material, it being understood that I do not wish to limit myself thereto as the features of the invention are adapted for broad application wherever it is desired to form a continuous web from a mass of plastic material which contains various solvent mixtures or other dispersing mediums.

The apparatus shown is merely for explaining the novel features of the invention and may be varied within wide limits so as to adapt the novel features thereof for use in connection with various materials.

In the drawings:

Fig. 1 is an elevational diagrammatic view partly in section showing one form of an apparatus for carrying out the novel features of the invention;

Fig. 2 is a similar view showing a modified form of an apparatus which is adapted to carry out the same or similar underlying principles; and Fig. 2a is a modified form of a discharge nozzle.

The method and apparatus constituting the novel features of the invention will now be described in detail with reference to its use in connection with the manufacture of a continuous web from a mass of plastic material.

A mass of material to be formed into a web is prepared in any of the well known ways (that is by mixing, purifying, etc.) and will be more or less plastic, depending upon the constituents of the mass and their relative proportions, which will of course be within the control of the operator.

Where cellulose esters or pyroxylin are used as a base, the mass, as is usual, will contain a solvent mixture or some suitable dispersing medium of some type or other and in such amounts or proportions as will provide the desired degree of placticity to enable the mass to be discharged through or allowed to flow through an elongated slot or opening to thereby provide a relatively thin web-like stream of material.

To accomplish this discharging or flowing of the material, I show in Fig. 1 a hopper 3 for containing the mass of material, said hopper being provided with a nozzle having an elongated slot 2 through which the material may be discharged. Under certain conditions, it may be desirable to prepare the mass so that it is flowable whereby it may flow through the slot by gravity. This may be readily accomplished by arranging the hopper so as to carry the material at some convenient distance above the slot to provide a head therefor. Under certain other conditions, it may be desired to prepare the material so that it is less fluid and therefore not readily flowable and to force the material in this condition through the slot by some mechanical or other means.

To accomplish this, a rotating feed screw 2' such as indicated may be employed or it may be forced through the slot by rotating or reciprocating propelling members of any well known form. Other means may be employed such as subjecting the mass to air or gas supplied under pressure by suitable apparatus; or it may well be desired to pump the mass to and through the slot in order to discharge it in a continuous stream.

By regulating the flow of material by providing means for that purpose either by adjusting the means for facilitating the discharge thereof or by adjusting the size of the slot, it will be possible to control the rate of flow of the material and thereby control the thickness of the web-like stream of material and bring about the production of a web of some predetermined thickness, which thickness may be uniform or it may be varied at will during the operation of the apparatus, all as may be desired.

According to the form of the invention as shown in Fig. 1, the material is discharged into a liquid bath of some sort which will be of such a nature as will act on the material so as to cause a coagulation or precipitation thereof in order to set or solidify the material in the form of a web. Where the material being discharged is pyroxylin or cellulose ester, or other material which contains solvent, solvent mixtures or a dispersing medium, the bath employed is preferably a non-solvent liquid and one which is miscible with the solvent or dispersing medium and is adapted to take up the solvent or dispersing medium and thereby tend to accelerate the solidifying action of the material.

In any case, the bath liquid may be carried in a container or tank 5 while the discharge nozzle may be arranged to discharge the material into the bath at some distance below the upper level or onto the surface of the liquid, as may be desired.

If desired, depending either on the nature or characteristics of the material being discharged into the bath or the thickness of the web like stream etc., a conveyor for the material may be provided which will transport it through the bath to thereby obviate the web being subjected to pulling strains. Such a conveyor may take the form of an endless belt 15 supported by rotatable rolls or pulleys 16 which may be driven at some convenient speed, so that the belt will be moved at some definite predetermined speed with reference to the discharging rate of the material. Under some conditions it may be desired to provide a conveyor which may comprise successive rollers or the like for supporting the web and transporting it through the bath. The container 5 is preferably closed at the top to prevent vapor being driven off and thereby result in the loss of solvent; but under some conditions it may be well to collect the vapor and convey it away from the apparatus and to treat it in such a manner as to facilitate the recovery of the precipitating or coagulating liquid as well as the solvent or dispersing medium.

The liquid bath is likely to become overladen with solvent or dispersing medium, in which case it is desirable to keep the liquid in circulation and to separate the solvent or dispersing medium therefrom to condition or adjust the bath so that it will function to take up the solvent from the material. This may be accomplished by providing an outlet conduit 13 which will conduct the liquid to a distilling apparatus 10 of well known form which will separate the solvent or dispersing medium from the bath liquid, although any other suitable form of apparatus may be employed. The solvent or dispersing medium thus recovered may be delivered from the apparatus 10 by a pipe 12 to a suitable supply tank 11, while the bath liquid may be pumped upwardly through a pipe 14 by a pump 13' back into the bath tank 5.

As the web is formed by action of the liquid on the material as it is discharged thereinto and conveyed through the liquid, it becomes sufficiently rigid so that it may be transferred from the liquid bath into a drying apparatus which may, in the form shown, comprise a drying chamber 18 through which the web may be carried by any convenient form of carrier.

In order to facilitate the drying action, heated air or gas may be delivered to the drying chamber 18, depending upon the nature of the material; and in the case of cellulose ester materials which contain solvents, the drying action will tend to drive off the remaining solvent in the form of vapor. To accommodate a continuous length of web, the drying apparatus may be provided with a festoon drying mechanism such as used in the paper manufacturing art, and in the form shown consists of the well known form of chains 19 at opposite sides of the chamber which are supported and driven by suitable guide wheels or sprockets 20, while rods 21 extend transversely of the chamber and are supported by the chains so as to be adapted to engage and suspend the web so that it is carried in the form of loops from one end of the dryer to the other for the drying operation.

In order to recover any solvent or ingredients of the bath carried by the web and which may be driven off in the form of vapor, a pipe 22 at the upper side of the drying chamber may be connected to a suction device such as a fan 9 which will deliver the vapor to condensing or scrubbing apparatus 23. This apparatus will preferably be of some well known form adapted to transform the vapor into a liquid form so that it may flow by means of the pipe 24 to the receptacle 11. Of course, if the liquid contains bath liquid as well as solvent or dispersing medium, they may be separated in any of the well known ways.

Where air or gas for drying is delivered to the chamber under pressure, it may be possible to dispense with the suction device and rely on the circulation of the air or gas or the pressure thereof to force the vapor into the apparatus 23.

From the drying apparatus, the web is taken up by some form of take-up mechanism and may be engaged between the bite of coacting rolls 25 of what may be termed a calender indicated at 26. These rolls may be geared together so as to exert a pulling action on the web to take it up as it is delivered by the dryer, or may be arranged to pull it through the drier if no transporter is provided as it may be desirable to eliminate the festoon web carrying mechanism and rely solely on the rolls or equivalent mechanism to pull the web through the drying chamber or other drying apparatus.

If desired, the rolls may be arranged to exert a polishing action on the web, so that not only do they polish the web but they also act to deliver the web in continuous form for subsequent operations. While the rolls may not be necessary or desirable for this polishing effect, they may well be adapted to take up the web and facilitate its passage through the apparatus. The web, after leaving the take-up mechanism, may be cut to such lengths as may be desired or, depending upon its thickness and physical characteristics, may under certain conditions be taken up by a winding reel, drum or the like which will form the web into a roll.

According to a modification of the invention, as will be explained with reference particularly to Fig. 2, the web is formed as the plastic material is discharged from a nozzle 29 in a web-like stream, as in the former case. A screw is shown for propelling the material through the nozzle; but, as in the former case, any other suitable means may be employed or the apparatus may be arranged so that the material will flow therethrough by gravity. To set or solidify the material as it emerges from the nozzle, it may be discharged into a bath of suitable liquid carried by a tank 30, as in the former case, so that the liquid will not only precipitate the discharged material and set or solidify the same but will take up solvent or dispersing medium from the discharged material, or will react chemically as in the former case. If desired, as in Fig. 2a, the material may be acted upon and solidified to form a web by a blast or jets of fluid, air or gas, rather than by a bath. The jets in that case may be directed thereagainst by nozzles 31 having elongated outlets or openings disposed at points adjacent the nozzle 29. These nozzles 31 may be suitably connected to a compressor or fan so that air or gas may be discharged at any pressure or temperature which will give the best results, so that by action of the air or gas the material will be set in the web form as it is discharged by the nozzle.

The web thus formed either by action of air or gas jets or action of the bath, passes upwardly through a chute or slot 32 which may be formed by wall members 33 and 34 and is caught and taken up by take-up mechanism such as coacting pressure rolls 35′ of a calender 36′.

The slot 32 is preferably formed to have a width greater than the thickness of the web so that the web will not contact therewith and other air or gas jets may be directed thereagainst by nozzles 35 spaced apart in opposite walls of the slot. These air jets not only tend to assist the web in traveling upwardly of the slot and keep it out of contact therewith but tend to dry the web by driving off the solvent therein, the solvent vapor being directed upwardly of the chute or slot into an upper hood or chamber 36.

The take-up mechanism in the form of rolls 35′ is preferably arranged and adapted to move the web upwardly of the chute and may, if desired, be adapted to polish or finish the web in any desired manner; and as the web leaves the calender it may, as in the former case, be cut into any desired lengths.

Also, as in the former case, the liquid bath and vapor may be treated to recover and separate the solvent or dispersing medium from the liquid of the bath so that the desired economy in operation is effected. This may be accomplished by means of any suitable apparatus which will effect the desired result, the selection of which will depend upon the characteristics of the solvent or dispersing medium and the liquid bath, if it is used.

From the foregoing, it will be observed that I have provided a method and apparatus wherein the material is transformed from a mass into a continuous web by being discharged in a web-like stream and freed of solvent or dispersing medium and is subsequently dried and finally finished or polished if desired, the steps being successively arranged so that the web is delivered in a finished form without handling between the steps of the method.

Also, it will be observed that provision is made for the recovery of solvent or other material which not only tends to accelerate the drying and conditioning of the web, but cooperates with the other steps of the method to effect an economy in manufacturing costs.

The invention may be practiced in various ways in connection with various materials and by means of various forms of apparatus without departing from the scope and spirit of the novel features of the invention; and I prefer therefore to be limited by the appended claims rather than by the foregoing description.

What I claim is:

1. The method of producing a continuous web without chemical reaction from a soft mass of cellulose ester material which consists in, discharging said material through an orifice to provide a web like stream and in forming the same into a relatively hard web by subjecting the stream to the action of a fluid which is a non-solvent of the mass.

2. The method of producing a substantially hard continuous web without chemical reaction from a relatively soft mass of cellulose ester material containing solvent which consists in, discharging the said material in a web like stream and in simultaneously hardening the stream to form a web by subjecting the same to the action of a liquid which is a non-solvent of the mass.

3. The method of producing without chemical reaction a substantially hard web from a mass of cellulose ester material which contains solvent and is in a relatively soft condition which consists in, discharging said soft material in a web like stream and in subjecting the same to the action of a non-solvent liquid, the said liquid being adapted to take up the solvent and co-operate with the discharging to provide the said hard web.

4. The method of producing a substantially hard web from a relatively soft mass of cellulose ester material containing solvent which consists in, discharging said soft material in a stream to form a continuous body of web thickness and in contacting the same with a hardening medium which is adapted to take up said solvent whereby the hard web is provided by the co-operating discharging and contacting steps without chemical reaction.

5. The method of producing a substantially hard rigid web from a mass of relatively soft less rigid material containing solvent without chemical reaction which consists in, discharging the mass in a continuous stream of substantial width and of a thickness corresponding to that of the web and in contacting the same with a non-solvent fluid which is adapted to take up said solvent and harden the web whereby the web is formed by the co-operating discharging and hardening steps.

6. The method of forming a continuous web from a mass of plastic material which consists in discharging said mass in a web-like stream into a fluid, the said fluid being adapted to precipitate the material of the stream to form a web and then in adjusting the ability of the fluid to precipitate the material.

7. The method of forming a continuous web from a mass of plastic material containing solvent which consists in discharging said mass in a continuous web-like stream into a substantially non-solvent liquid, the said liquid being adapted to take up solvent from and precipitate the material so as to form a web thereof and then in separating solvent from the liquid to thereby adjust its ability to take up the said solvent.

8. An apparatus for forming a continuous web from a mass of material comprising in combination, a nozzle for discharging a continuous web-like stream of material, a container for a bath for receiving said discharged material and a drying apparatus for receiving and drying said web, the said nozzle being disposed to discharge the stream directly into a bath in said tank.

9. An apparatus for forming a continuous web from a mass of material, comprising a nozzle having an elongated slot for discharging a continuous web-like stream of material, a container for liquid bath for receiving said web, means for conveying said web through said bath and means for drying said web, the said nozzle being disposed so as to discharge a stream directly into a bath in said tank.

10. An apparatus for forming a continuous web from a mass of material, comprising in combination, a nozzle having an elongated slot for discharging a continuous web-like stream of material, a container for a bath for receiving said web, the said nozzle and container being relatively disposed so that a stream is discharged directly into a bath in said tank, a transporter for conveying said web through said bath, a drying chamber for receiving said web, take up mechanism for receiving and taking up on said web, all adapted and arranged whereby the web is moved continuously from said nozzle to said take up mechanism.

11. An apparatus for forming a continuous web from a mass of plastic material comprising in combination, a receptacle for a liquid bath, a nozzle for discharging a web-like stream of material into said receptacle, the said nozzle and receptacle being relatively disposed so that material is discharged directly into a bath in said receptacle, a conveyer for continuously moving discharged material through and out of said receptacle, a drying apparatus for receiving said web, and means for moving said web through and out of said drying apparatus.

12. An apparatus for forming a continuous web from a mass of plastic material comprising in combination, a receptacle for a liquid bath, a nozzle for discharging a web-like stream of material into said receptacle, the said nozzle and receptacle being relatively disposed so that material is discharged directly into a bath in said receptacle, a conveyer for continuously moving discharged material through and out of said receptacle, a drying apparatus for receiving said web, and means for moving said web through and out of said drying apparatus and take up mechanism for taking up said web.

13. An apparatus for forming a continuous web from a mass of material containing a solvent comprising a receptacle in which is a bath containing a liquid for extracting the solvent, a nozzle for discharging a continuous web-like stream of material into said bath, a drying apparatus for receiving and drying the web, and apparatus connected to said receptacle for separating the extracting liquid from the solvent and returning said extracting liquid to the said receptacle.

14. An apparatus for forming a continuous web from a mass of material containing a solvent comprising a receptacle in which is a bath containing a liquid for extracting the solvent, a nozzle for discharging a continuous web-like stream of the material into said bath, a drying apparatus for receiving and drying the web, and means in connection with the drying apparatus for recovering the vapors given off in the drying apparatus.

15. An apparatus for forming a continuous web from a mass of material containing a solvent comprising a receptacle in which is a bath containing a liquid for extracting the solvent, a nozzle for discharging a continuous web-like stream of the material directly into said bath, a drying apparatus for receiving and drying the web, means in connection with the drying apparatus for recovering the vapors given off in the drying apparatus, and means connected to said receptacle for separating the extracting liquid from the solvent and returning said extracting liquid to the said receptacle.

In testimony whereof I have affixed my signature.

GUSTAVUS J. ESSELEN, Jr.